(12) United States Patent
Fuqua et al.

(10) Patent No.: US 8,997,712 B2
(45) Date of Patent: Apr. 7, 2015

(54) TWO STROKE, OPPOSED-PISTON ENGINE WITH ENGINE BRAKING

(71) Applicant: Achates Power, Inc., San Diego, CA (US)

(72) Inventors: Kevin B. Fuqua, San Diego, CA (US); Iain J. Read, Warren, MI (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 14/550,813

(22) Filed: Nov. 21, 2014

(65) Prior Publication Data

US 2015/0068492 A1    Mar. 12, 2015

Related U.S. Application Data

(62) Division of application No. 13/385,510, filed on Feb. 21, 2012, now Pat. No. 8,919,304.

(60) Provisional application No. 61/463,815, filed on Feb. 23, 2011.

(51) Int. Cl.
| | |
|---|---|
| *F01L 13/06* | (2006.01) |
| *F02B 25/08* | (2006.01) |
| *F02D 13/04* | (2006.01) |
| *F02D 21/08* | (2006.01) |

(52) U.S. Cl.
CPC ............. *F02B 25/08* (2013.01); *F02D 13/04* (2013.01); *F02D 21/08* (2013.01)

(58) Field of Classification Search
USPC ......... 123/51 B, 320, 323, 324, 51 R, 51 AA, 123/51 AC, 51 BA, 51 BB, 51 BC, 51 BD, 123/65 W, 65 P, 52.2, 52.4, 52.5; 137/625.47, 625.48, 625.17, 625.18, 137/625.25
See application file for complete search history.

(56) References Cited

U.S. PATENT DOCUMENTS

| | | | |
|---|---|---|---|
| 1,432,320 A | * | 10/1922 | Bronander .............. 123/51 BA |
| 1,660,610 A | | 2/1928 | Fornaca |
| 2,136,466 A | * | 11/1938 | Ritz .............................. 123/446 |
| 2,968,295 A | | 1/1961 | Haller |
| 3,220,392 A | | 11/1965 | Cummins |
| 3,367,312 A | | 2/1968 | Jonsson |
| 3,547,087 A | | 12/1970 | Siegler |
| 3,638,632 A | | 2/1972 | Boling |

(Continued)

FOREIGN PATENT DOCUMENTS

| | | |
|---|---|---|
| DE | 103 44 737 B3 | 8/2004 |
| EP | 2 053 219 A1 | 4/2009 |

(Continued)

OTHER PUBLICATIONS

International Preliminary Report on Patentability for PCT/US2011/001896, mailed by the EPO on May 30, 2013.

(Continued)

*Primary Examiner* — Hung Q Nguyen
(74) *Attorney, Agent, or Firm* — Terrance A. Meador

(57) ABSTRACT

In a two-stroke opposed-piston engine, a ported cylinder with a pair of opposed pistons is equipped with an engine brake including an engine braking valve that can be opened to release air from the cylinder as the pistons cycle between BDC and TDC positions.

4 Claims, 8 Drawing Sheets

(56) References Cited

U.S. PATENT DOCUMENTS

| | | | |
|---|---|---|---|
| 3,667,435 A * | 6/1972 | Bygdnes | 123/327 |
| 3,707,952 A | 1/1973 | Knebel | |
| 4,305,349 A | 12/1981 | Zimmerly | |
| 4,426,985 A | 1/1984 | Kanesaka | |
| 4,473,047 A | 9/1984 | Jakuba et al. | |
| 4,474,006 A | 10/1984 | Price et al. | |
| 5,758,620 A | 6/1998 | Warner | |
| 6,182,619 B1 | 2/2001 | Spitzer | |
| 6,213,091 B1 | 4/2001 | Haugen | |
| 6,470,851 B1 | 10/2002 | DeGroot et al. | |
| 6,866,017 B2 | 3/2005 | Ruggiero et al. | |
| 6,899,079 B1 | 5/2005 | Hill et al. | |
| 7,162,996 B2 | 1/2007 | Yang | |
| 7,347,171 B2 | 3/2008 | Leman et al. | |
| 7,753,036 B2 | 7/2010 | Lents et al. | |
| 8,746,190 B2 | 6/2014 | Lemke et al. | |
| 2004/0134455 A1 | 7/2004 | Korenjak et al. | |
| 2012/0125298 A1 | 5/2012 | Lemke et al. | |
| 2012/0210985 A1 | 8/2012 | Fuqua et al. | |

FOREIGN PATENT DOCUMENTS

| | | |
|---|---|---|
| GB | 102002 | 11/1916 |
| GB | 562635 | 7/1944 |
| GB | 1466311 | 3/1977 |
| GB | 2464704 A | 4/2010 |
| WO | WO-2012/067643 A1 | 5/2012 |
| WO | WO-2013/058802 A1 | 4/2013 |

OTHER PUBLICATIONS

International Preliminary Report on Patentability for PCT/US2012/000102, mailed by the EPO on Sep. 6, 2013.

* cited by examiner

TWO STROKE, OPPOSED-PISTON ENGINE WITH ENGINE BRAKING

PRIORITY

This application is a divisional of U.S. patent application Ser. No. 13/385,510, filed Feb. 21, 2012, published as US 2012/0210985 A1 on Aug. 23, 2012, which claims priority to U.S. provisional application for patent 61/463,815, filed Feb. 23, 2011.

RELATED APPLICATION

This application contains subject matter related to that of U.S. patent application Ser. No. 13/373,448, filed Nov. 14, 2011, titled "Two-Stroke, Opposed-Pistons with Compression Release for Engine Braking", published as US 2012/0125298 A1 on May 24, 2012, now U.S. Pat. No. 8,746,190, issued Jun. 10, 2014.

BACKGROUND

The field is internal combustion engines. Particularly, the field relates to two-stroke engines with ported cylinders. In more particular applications, the field relates to constructions and methods for releasing charge air from a ported cylinder equipped with opposed pistons so as to enable engine braking.

When compared with four-stroke engines, ported, two-stroke, opposed-piston engines have acknowledged advantages of specific output, power density, and power-to-weight ratio. For these and other reasons, after almost a century of limited use, increasing attention is being given to the utilization of opposed-piston engines in a wide variety of modern transportation applications. A representative opposed-piston engine is illustrated in FIGS. 1 and 2. As seen in FIG. 1, the opposed-piston engine includes one or more cylinders 10, each with a bore 12 and longitudinally-displaced exhaust and intake ports 14 and 16 machined or formed therein. Each of one or more fuel injector nozzles 17 is located in a respective injector port that opens through the side of the cylinder, at or near the longitudinal center of the cylinder. Two pistons 20, 22 are disposed in the bore 12 with their end surfaces 20e, 22e in opposition to each other. For convenience, the piston 20 is referred as the "exhaust" piston because of its proximity to the exhaust port 14; and, the end of the cylinder wherein the exhaust port is formed is referred to as the "exhaust end". Similarly, the piston 22 is referred as the "intake" piston because of its proximity to the intake port 16, and the corresponding end of the cylinder is the "intake end".

Opposed Piston Fundamentals:

Operation of an opposed-piston engine with one or more cylinders 10 is well understood. In this regard, and with reference to FIG. 2, in response to combustion occurring between the end surfaces 20e, 22e the opposed pistons move away from respective top dead center (TDC) locations where they are at their innermost positions in the cylinder. While moving from TDC, the pistons keep their associated ports closed until they approach respective bottom dead center (BDC) locations in which they are at their outermost positions in the cylinder. In a useful, but not a necessary aspect of opposed-piston engine construction, a phase offset is introduced in the piston movements that produces a sequence in which the exhaust port 14 opens as the exhaust piston 20 approaches BDC before the intake port 16 opens so that exhaust gasses produced by combustion start to flow out of the exhaust port 14. As the intake piston approaches BDC, the intake port 16 opens and a charge of pressurized air ("charge air"), with or without recirculated exhaust gas, is forced into the cylinder 10. The charge air entering the cylinder drives exhaust gasses out of the exhaust port 14; this process is referred to as "scavenging".

As per FIG. 1, presuming the phase offset mentioned above, after the exhaust port 14 is closed, the intake port 16 closes and the charge air remaining in the cylinder is compressed between the end surfaces 20e and 22e. Typically, the charge air is swirled as it passes through the intake port 16 to promote scavenging while the ports are open and, after the ports close, to mix the air with the injected fuel. The fuel is typically diesel, which is injected into the cylinder by one or more high pressure injectors. With reference to FIG. 1 as an example, the swirling charge air 30 has a generally helical motion that forms a vorticity in the bore which circulates around the longitudinal axis of the cylinder. As best seen in FIG. 2, as the pistons advance toward their respective TDC locations in the cylinder bore, fuel 40 is injected through a nozzle 17 directly into the swirling charge air 30, between the end surfaces 20e, 22e of the pistons. The swirling mixture of charge air and fuel is compressed in a combustion chamber 32 defined between the end surfaces 20e and 22e when the pistons 20 and 22 move through their respective TDC locations. When the mixture reaches an ignition temperature, the fuel ignites in the combustion chamber, driving the pistons apart toward their respective BDC locations. In two-stroke engines, the process of compressing air to obtain ignition of fuel injected into the air is referred to as "compression ignition".

Release of compressed charge air is advantageous in some aspects of diesel engine operation. Engine braking that is synchronized with the stroke-cycle of the engine (also called "decompression braking" and "compression-release braking") is particularly useful feature for medium and heavy duty trucks equipped with diesel engines. Compression-release braking is activated in a valved, four-stroke diesel engine by halting fuel injection, closing EGR valves, and releasing compressed charge air from the cylinder when the piston is at or near the top of its compression stroke, immediately before the expansion stroke begins. Releasing the compressed air at this point releases energy that would otherwise urge the piston from top to bottom dead center during the expansion stroke. This significantly reduces the work extracted from the pistons as they return to BDC, which produces the desirable braking effect.

In valved engines constructed for compression-release braking, the compressed air is released by opening an exhaust valve out of sequence at or near the end of the compression stroke. The compressed air flows through the open valve into the exhaust system. At BDC, charge air is again admitted to the cylinder. As the cycle repeats, potential engine energy is discarded by release of the compressed air, which causes the engine to slow down. Compression-release braking significantly enhances the braking capability of medium and heavy duty vehicles, thereby making them safer to operate, even at higher average speeds. Furthermore, in contributing significant additional braking capacity, a compression-release braking system extends the lifetime of the mechanical, braking systems in medium and heavy duty trucks, which reduces the costs of maintenance over the lifetime of such vehicles.

Compression-release braking constructions for four-stroke engines typically operate in response to a manually-generated signal accompanied by release of the throttle. When engine braking is activated, the cylinder is vented through an exhaust valve that is opened out of sequence during the compression stroke. In a representative embodiment of compression-release braking in a four-stroke engine, U.S. Pat. No. 4,473,047 teaches the provision of two exhaust valves per cylinder. During normal operation, both valves are open during the exhaust stroke. When compression-release braking is actuated, one of the exhaust valves is opened at or near TDC of the compression stroke.

In a simpler and more easily-implemented mode of engine braking, exhaust and/or intake valves are held open continuously throughout a braking period while the supply of fuel is interrupted. Substantial braking power is thereby generated, without the need for synchronization to the engine operating cycle. U.S. Pat. No. 3,547,087 teaches the use of a hydraulically-actuated blocking arm that advances to block return movement of a rocker arm associated with a valve. With the return oscillation of the rocker arm blocked, the associated valve is kept at least partially opened until the blocking arm is retracted. Charge air provided to the cylinder is continuously returned through the open valve to the exhaust channel.

Conventional four-stroke diesel engines achieve the advantages of engine braking by modifications of intake and/or exhaust valve mechanisms that are designed to interrupt the normal operation of engine valves during certain portions of the engine operating cycle or throughout the entire cycle. The intake and exhaust valves are supported in a cylinder head and have associated actuation machinery. However, two-stroke opposed-piston engines do not include valves or cylinder heads. Instead, they intake charge air and exhaust combustion products through cylinder ports that are separated longitudinally on the cylinder and controlled by the pistons. Accordingly, without a cylinder head and intake and exhaust valves, an opposed-piston engine cannot incorporate the engine braking solutions tailored for valved diesel engines. Nevertheless, the addition of engine braking to opposed-piston engine operation would confer benefits and advantages that are realized by valved engines with these capabilities. Accordingly, there is a need for two-stroke, opposed-piston cylinder constructions that provide engine braking.

SUMMARY OF THE INVENTION

In order to realize advantages and benefits obtained with engine braking in an opposed-piston engine, it is desirable that air provided to a cylinder of the engine between the end surfaces of the opposed pistons be released from the cylinder as the pistons reciprocate between TDC and BDC positions.

The applicants' critical realization is that provision of an engine braking valve to each cylinder of an opposed-piston engine that can be opened to release air from the cylinder as the pistons cycle between BDC and TDC positions enables a simple, inexpensive and easily-operated engine brake.

Preferably, the engine braking valve remains open continuously while the engine is braking, unlike a compression-release brake whose openings and closings must be synchronized with the engine operating cycle. This allows the charge air to continuously bleed out from the cylinder. In this manner the pumping work done by the pistons is lost as heat as the charge air flows out through the engine braking valve. Preferably, once the charge air is expanded through the engine braking valve, it is discharged into the exhaust channel; optionally, it can be discharged into the intake channel.

Preferably, during engine braking, when the engine braking valve is opened, provision of fuel to the engine is interrupted, and the EGR valve is closed.

The cylinder is externally scavenged with a supercharger, which is beneficial to the engine braking operation because it increases the flow of charge air through the engine braking valve, thereby increasing the braking power available.

DETAILED DESCRIPTION OF THE PREFERRED EMBODIMENTS

The invention described in this specification is presented in an explanatory context that includes a ported, two-stroke engine having at least one cylinder with a bore in which a pair of pistons is disposed with their end surfaces in opposition. The engine is not limited to any specific number of crankshafts. For example, the invention can be applied to opposed-piston engines with one crankshaft, with two crankshafts, and with three or more crankshafts. From another aspect, the invention can be applied with any scheme for piston articulation in opposed-piston engines. In other aspects, the invention can be applied to an internal combustion engine construction that includes one or more ported cylinders, each with a bore, piston-controlled exhaust and intake ports, and a pair of pistons disposed in opposition in the bore.

Figure 1:
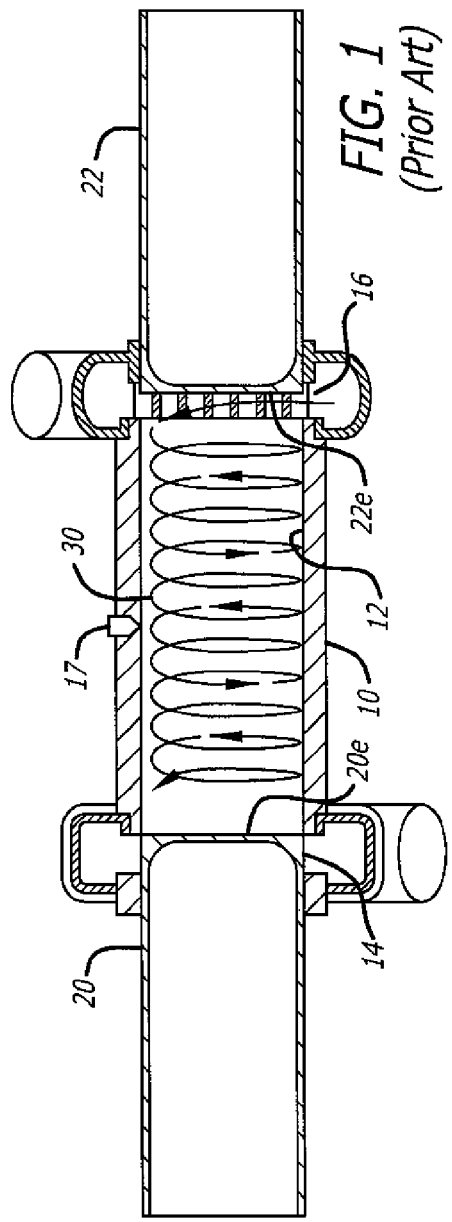
FIG. 1 is a side sectional partially schematic drawing of a cylinder of a prior art opposed-piston engine with opposed pistons near respective bottom dead center locations, and is appropriately labeled "Prior Art".
Figure 2:
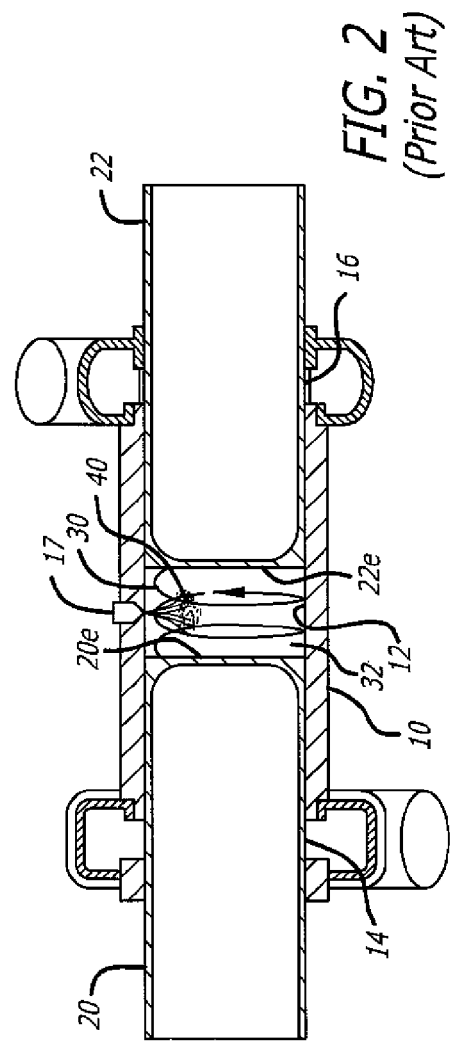
FIG. 2 is a side sectional partially schematic drawing of the cylinder of FIG. 1 with the opposed pistons near respective top dead center locations where end surfaces of the pistons define a combustion chamber, and is appropriately labeled "Prior Art".
Figure 3:
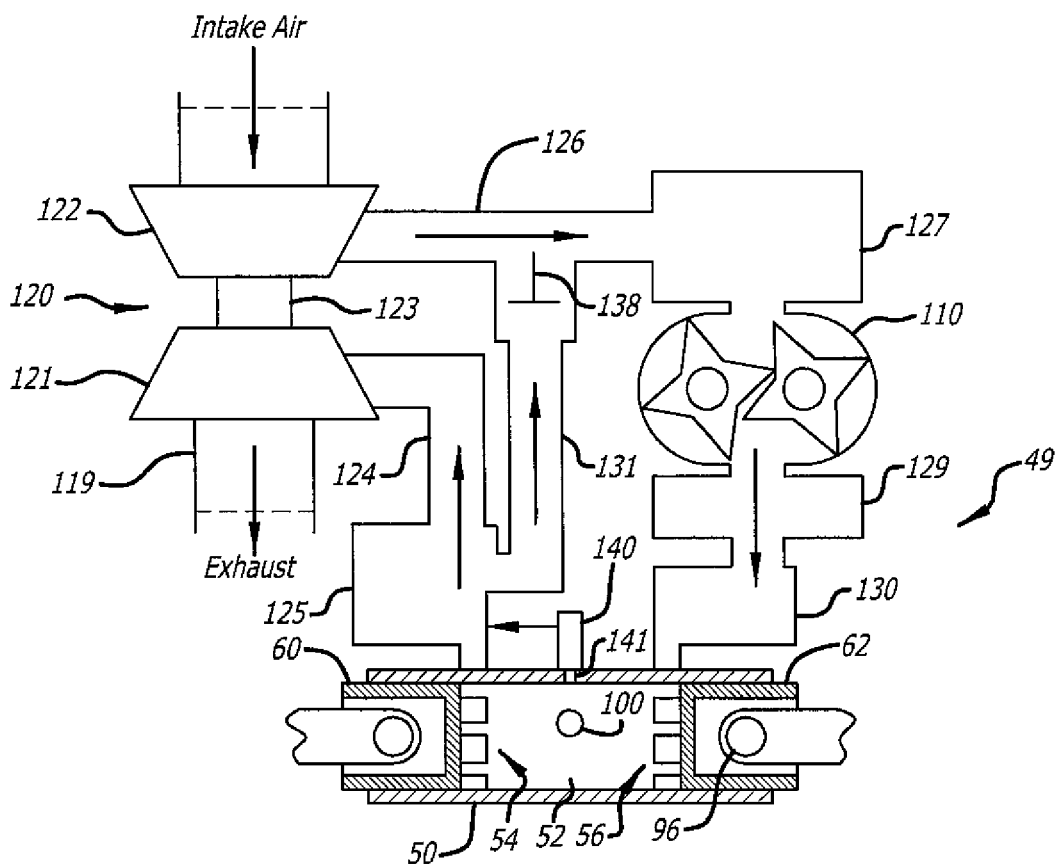
FIG. 3 is a conceptual schematic diagram of an opposed-piston engine in which aspects of the invention are illustrated.

In FIG. 3, an internal combustion engine 49 is embodied by an opposed-piston engine having one or more cylinders 50. For example, the engine may have one cylinder, two cylinders, or three or more cylinders. Each cylinder 50 has a bore 52 and exhaust and intake ports 54 and 56 formed or machined in respective ends of the cylinder. The exhaust and intake ports 54 and 56 each include a circumferential ring of openings in which adjacent openings are separated by a solid bridge. (In some descriptions, each opening is referred to as a "port"; however, the construction of a circumferential sequence of such "ports" is no different than the port constructions shown in FIG. 3.) Exhaust and intake pistons 60 and 62 are slidably disposed in the bore 52 with their end surfaces opposing one another. When the pistons 60 and 62 are at or near their TDC positions, combustion takes place in a combustion chamber defined by the bore 52 and the end surfaces of the pistons.

In the engine of FIG. 3, fuel is injected directly into the combustion chamber, between the piston end surfaces, through at least one fuel injector nozzle 100 positioned in an opening through the side of the cylinder 50.

With further reference to FIG. 3, an air charge system manages charge air provided to, and exhaust gas produced by, the engine 49. A representative air charge system construction includes a charge air source that compresses fresh air and a charge air channel through which charge air is transported to the at least one intake port of the engine. The air charge system construction also includes an exhaust channel through which the products of combustion (exhaust gasses) are transported from the at least one exhaust port, processed, and released into the atmosphere.

With reference to FIG. 3, the air charge system includes an exhaust manifold 125. Preferably, but not necessarily, the exhaust manifold 125 is constituted of an exhaust plenum that communicates with the exhaust ports 54 of all cylinders 50 of the engine. A turbo-charger 120 extracts energy from exhaust gas that exits the exhaust ports 54 and flows into a conduit 124 from the exhaust manifold 125. The turbo-charger 120 includes a turbine 121 and a compressor 122 that rotate on a common shaft 123. The turbo-charger 120 can be a single-geometry or a variable-geometry device. The turbine 121 is rotated by exhaust gas passing through it to an exhaust output 119. This rotates the compressor 122, causing it to compress fresh air obtained through an air input. The charge air output by the compressor 122 flows through a conduit 126 to a charge air cooler 127, and from there to a supercharger 110 where it is further compressed. The supercharger 110 is coupled by a belt linkage to a crankshaft so as to be driven thereby. The supercharger 110 can be a single-speed or multiple-speed device or a fully variable-speed device. Air compressed by the supercharger 110 is output from the supercharger through a charge air cooler 129 to an intake manifold 130. One or more intake ports 56 receive a charge of fresh air pressurized by the supercharger 110 through the intake manifold 130. Preferably, but not necessarily, in multi-cylinder opposed-piston engines, the intake manifold 130 is constituted of an intake plenum that communicates with the intake ports 56 of all cylinders 50. Preferably, but not necessarily, the air charge system of the engine in FIG. 3 includes an exhaust gas recirculation (EGR) channel that extracts exhaust gasses from the exhaust channel and processes and transports the extracted exhaust gasses into the incoming stream of fresh intake air by way of a valve-controlled recirculation channel 131 controlled by an EGR valve 138.

Engine Braking:

As per FIG. 3, in this invention, a ported cylinder with opposed pistons disposed therein is provided with an engine-braking valve 140 seated in an engine-braking port 141 that opens through the sidewall of the cylinder 50. The engine-braking valve includes a discharge passage connected to the exhaust channel. The engine-braking port 141 opens through the wall of the cylinder 50 at a location between the cylinder's exhaust and intake ports 54 and 56. Preferably, the engine-braking port 141 is located at or near the longitudinal center of the cylinder, between the TDC positions of the piston end surfaces.

Figure 4:
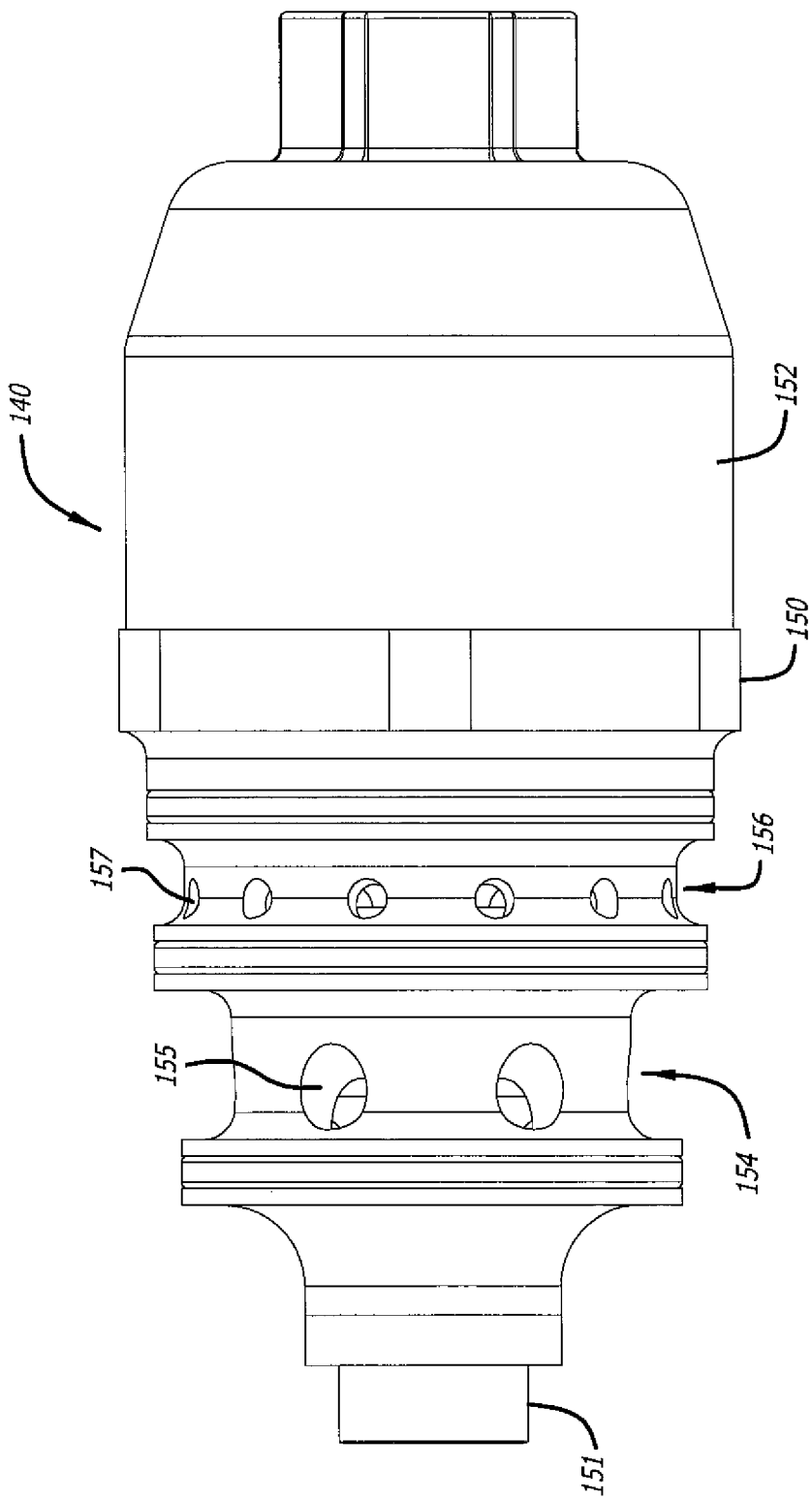
FIG. 4 is a side view of an engine braking valve according to the invention.
Figure 5:
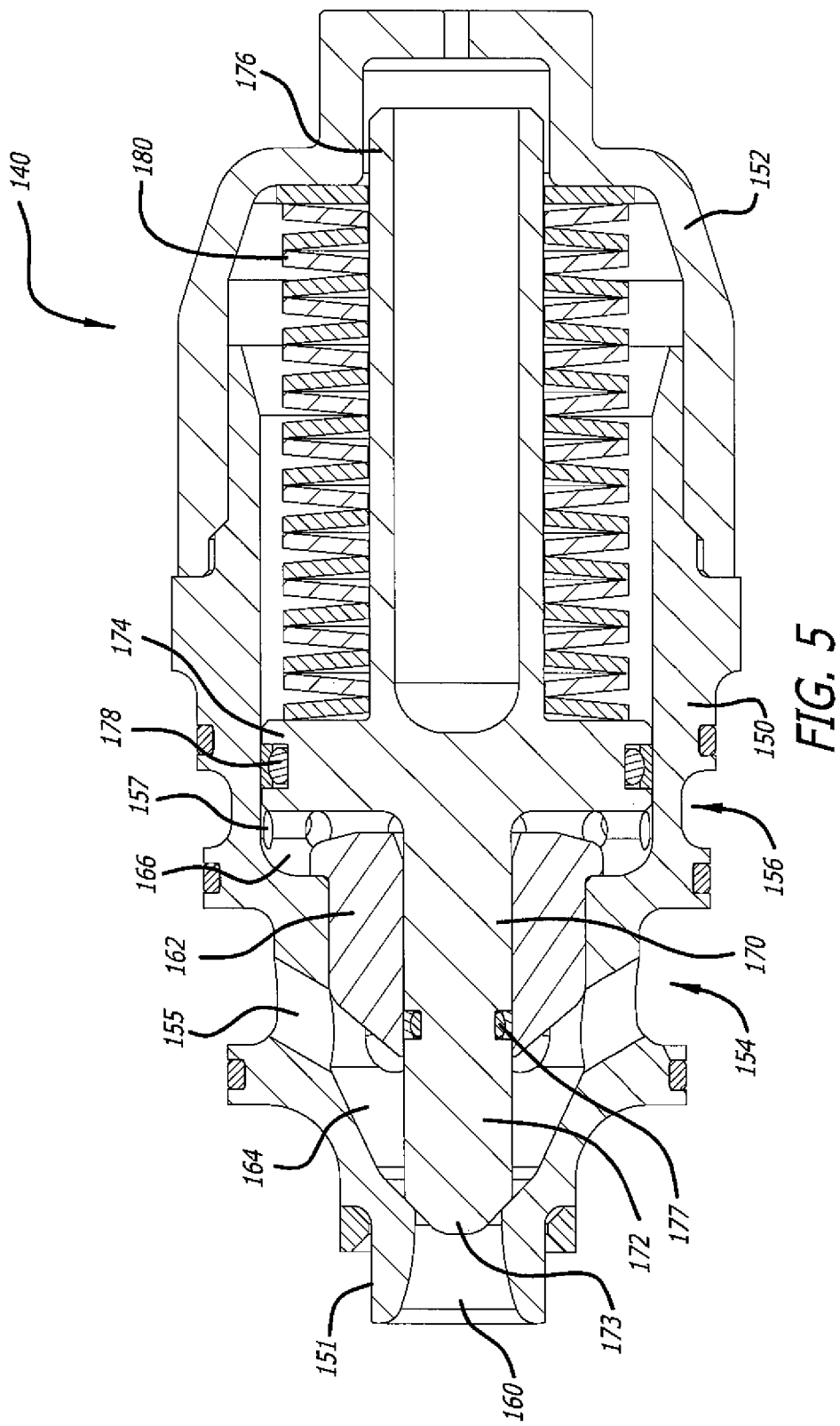
FIG. 5 is a side sectional view illustrating the interior construction of the engine braking valve of FIG. 4 when seated in an engine braking port of a ported cylinder of an opposed-piston engine.

Engine Braking Valve Construction:

A preferred engine braking valve construction is illustrated in FIGS. 4 and 5. As per FIG. 4 the engine braking valve 140 (hereinafter, "the valve 140") includes a valve body 150 with a threaded tip 151, a cap 152 threaded onto the rear of the valve body, a circumferential discharge groove 154 formed in the outer surface of the valve body, and a circumferential hydraulic control groove 156 also formed in the outer surface of the valve body. Air flow ports 155 open through the floor of the groove 154. Hydraulic fluid flow ports 157 open through the floor of the groove 156. As per FIG. 5, the valve body has an interior cavity that is closed at one end by the cap 152, and that is open at the opposing end via the orifice 160. A bronze valve guide 162 pressed into and seated in a forward portion of the interior space defines an air flow chamber 164 and a hydraulic flow chamber 166. The orifice 160 and the air flow ports 155 open into the air flow chamber 164. The air flow chamber 164 transitions to the orifice 160 through a frusto-conical surface that defines the valve seat 165 (best seen in FIG. 6). The hydraulic fluid flow ports 157 open into the hydraulic flow chamber 166. A valve piston 170 includes a needle-like plug 172 received in the central bore of the valve guide 162, a flange 174 that defines the moveable floor of the hydraulic flow chamber 166, and a spring guide 176. A spring 180 retained on the spring guide 176 is compressed between the flange 174 and the cap 152. Double-direction hydraulic piston seals are provided at 177 to seal the interface between the plug 172 and the bore of the valve guide, and at 178 to seal the interface between the side surface of the flange 174 and the bore in the rear of the valve body.

Figure 6:
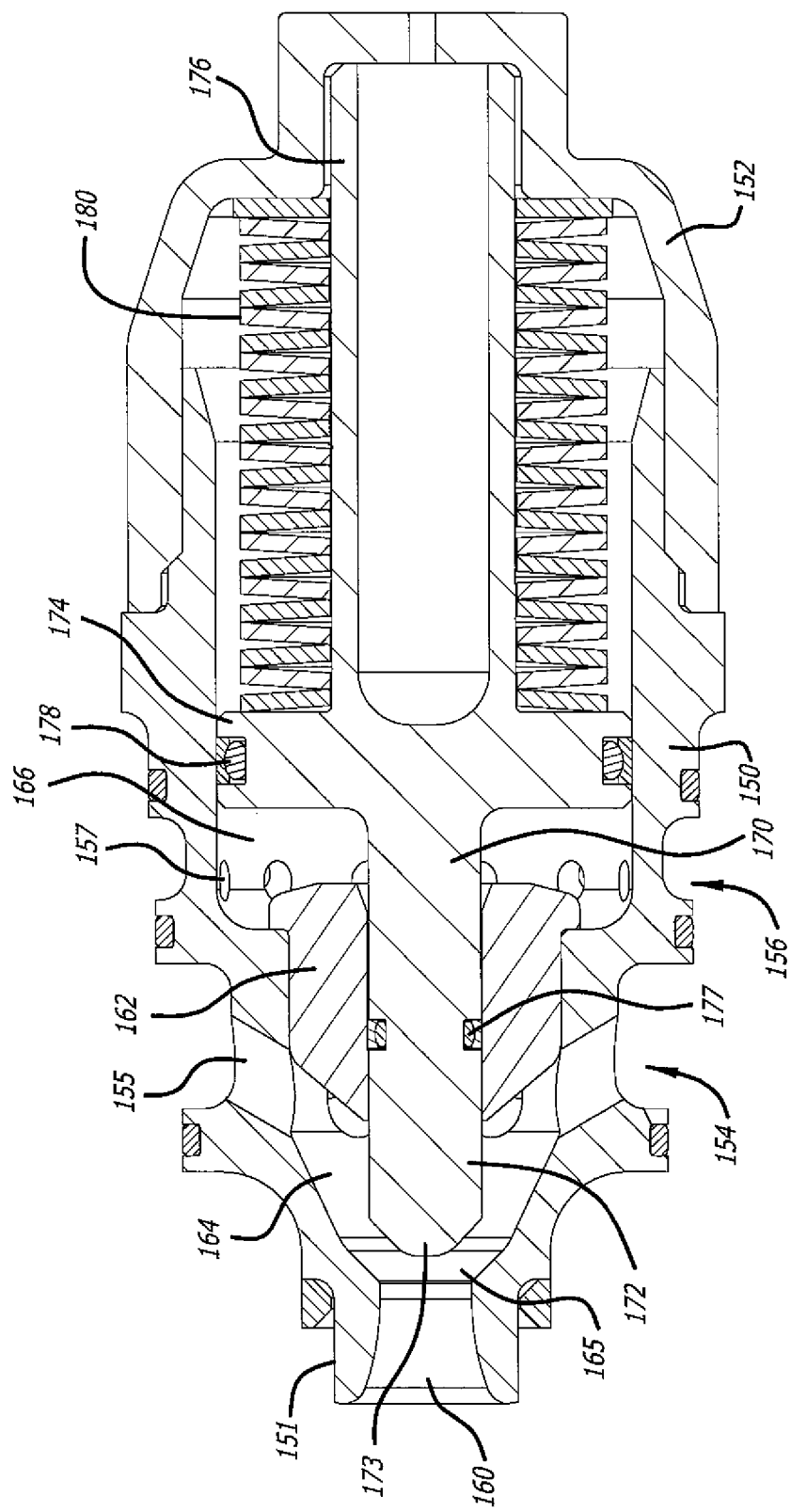
FIG. 6 is a side sectional view showing the engine braking valve at a full open position.

Engine Braking Valve Control:

FIG. 5 shows the valve 140 in a closed condition where the force exerted by the compressed spring 180 on the flange 174 exceeds any countervailing force exerted on the valve piston, including force exerted on the flange 174 by hydraulic fluid in the hydraulic flow chamber 166 and force exerted through the orifice 160 by gasses in the cylinder. In the closed condition of the valve 140, the tip 173 of the needle-like plug 172 is retained in sealing engagement with the valve seat 165 by the force of the compressed spring 180 so as to prevent the passage of gasses from the cylinder into the air flow chamber 164. FIG. 6 shows the valve 140 in an open condition where the force exerted by the compressed spring 180 on the flange 174 is exceeded by a countervailing force on the flange 174 by hydraulic fluid in the hydraulic flow chamber 166. Manifestly, the condition of the valve is determined by a hydraulic signal having a threshold pressure below which the valve 140 is closed and above which the valve 140 is open.

Figure 7:
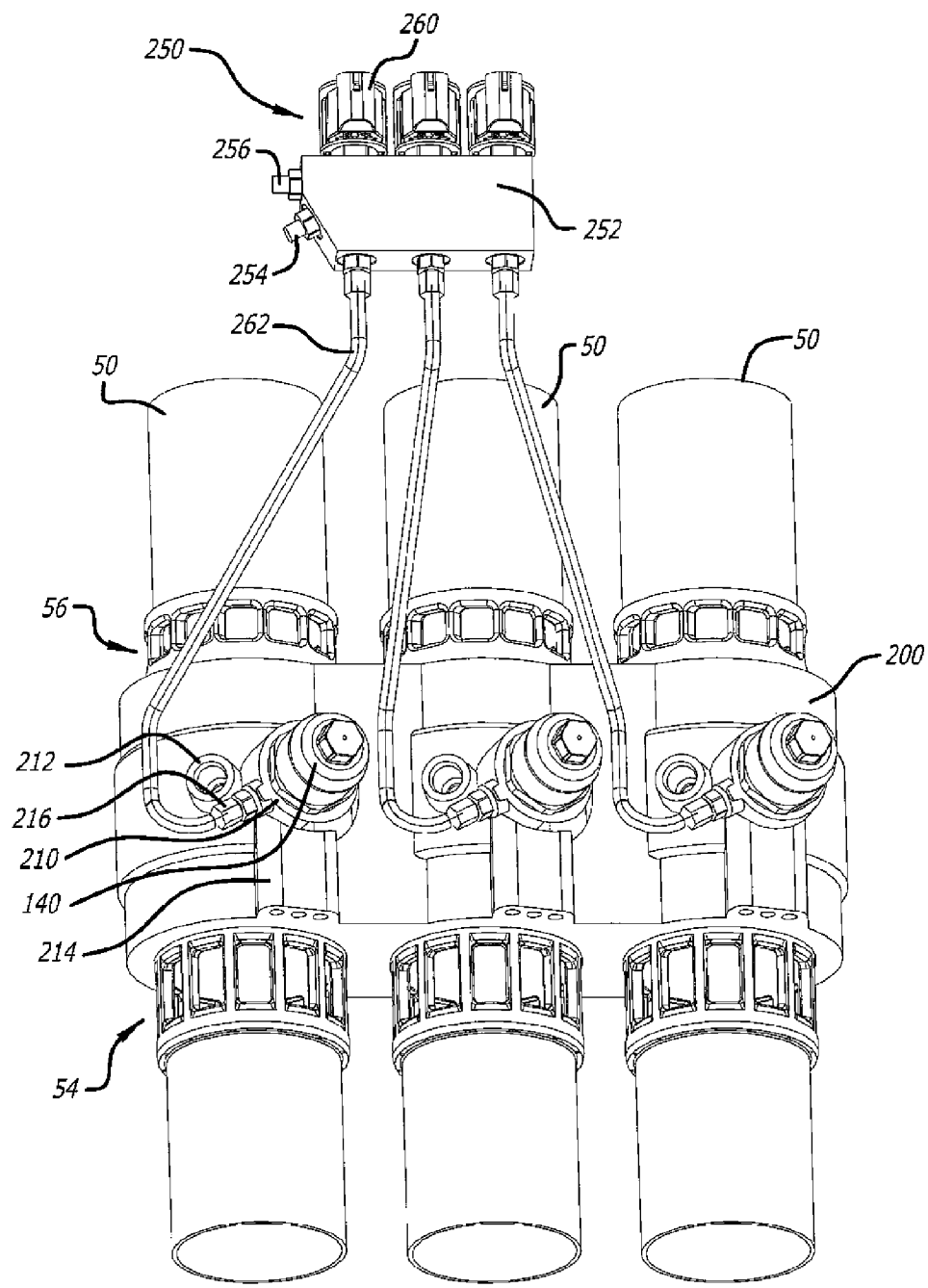
FIG. 7 illustrates three cylinders of an opposed-piston engine, each equipped with an engine braking valve.

Engine Braking Valve Installation:

FIG. 7 shows an opposed-piston engine structure with three ported cylinders 50, each equipped with an engine braking valve 140. A crankcase includes a center section 200 extending across the three cylinders. The crankcase includes a support boss 210 at each cylinder wherein an engine braking valve 140 for the cylinder is supported. The support collar includes bosses 212 for supporting fuel injectors (not shown). Each support boss 210 transitions to an air flow discharge passage 214 through which charge air exiting the circumferential discharge groove of the valve 140 flows to the exhaust channel. Each support boss 210 includes a threaded hydraulic port 216 that communicates with the circumferential hydraulic control groove of the valve 140. Pressurized hydraulic fluid is provided to the valves 140 from a set 250 of three individually-controlled, solenoid-operated hydraulic valves 260 mounted in a valve block 252. Pressurized hydraulic fluid is provided in a channel 254, and a hydraulic return is provided in a channel 256. Each hydraulic valve 260 is a 3-way, 2-position device that couples the hydraulic control groove of a respective engine braking valve 140 to either the pressure channel 254 or to the return channel 256 according to a solenoid control signal.

Figure 8:
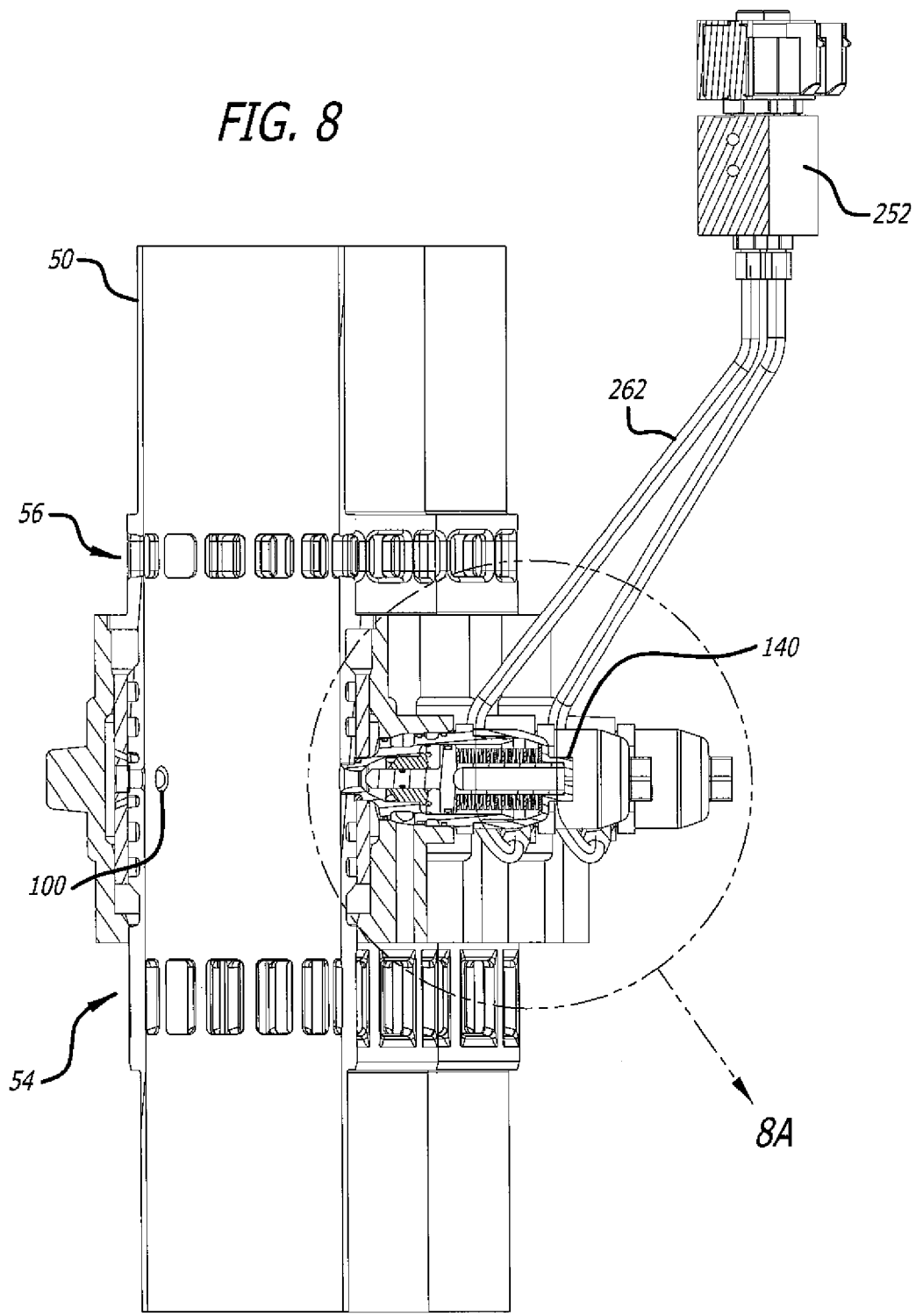
FIG. 8 illustrates three cylinders of an opposed-piston engine, each equipped with an engine braking valve and a pair of fuel injector ports, with one cylinder shown in section to show details of an engine braking valve mounting structure.
Figure 8A:
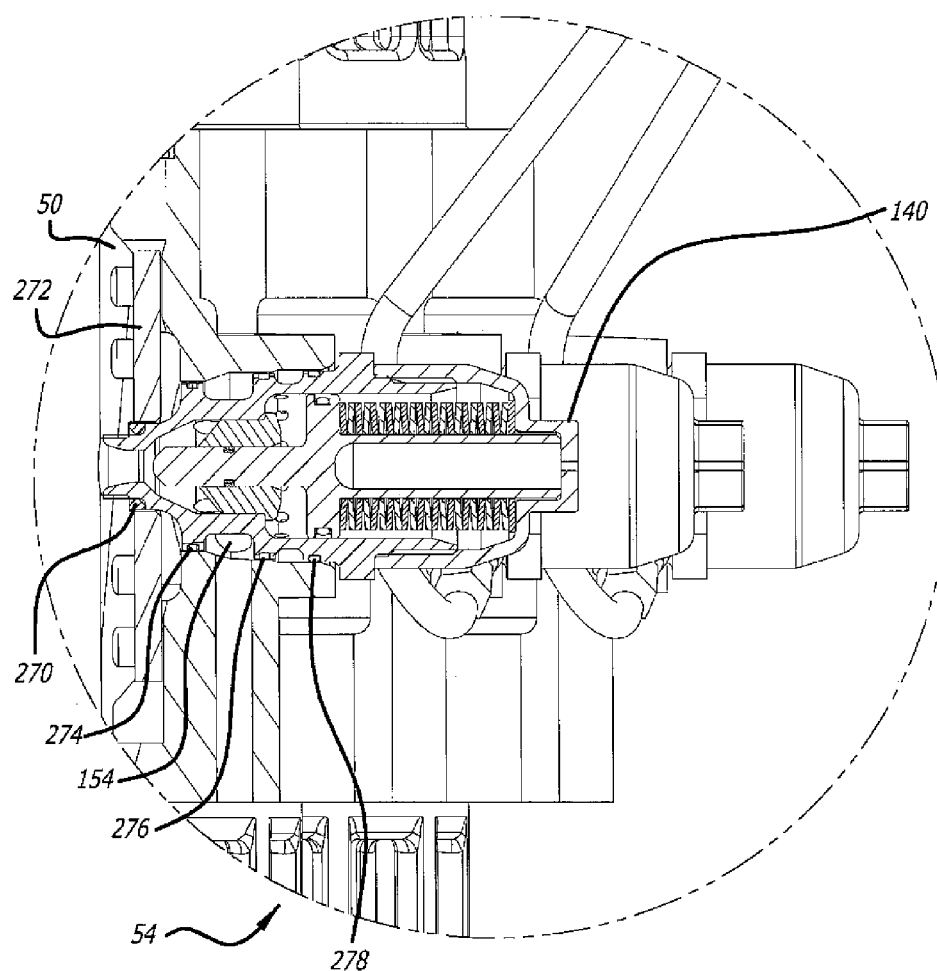
FIG. 8A is a magnified view of the circled portion of FIG. 8.

FIGS. 8 and 8A show how an engine braking valve 140 is installed in the crankcase (or other support structure) of the three-cylinder opposed-piston engine of FIG. 7. As seen in the figures, the engine control valve 140 is mounted generally in the center of the combustion space of the cylinder 50 at a circumferential location of the cylinder 50 where injector ports 100 are also positioned. A copper washer seal 270 is seated between the threaded tip 151 and a cylinder sleeve 272. O-ring seals 274, 276, and 278 seated between the outer surface of the valve body and the boss 210 isolate the discharge groove 154 and the hydraulic groove 156.

Fabrication and Materials:

The pistons and cylinders are manufactured by casting and/or machining metal materials. For example, the pistons may be constituted of a skirt assembled to a crown on which a piston end face is formed. The crown may comprise a high carbon steel such as 41-40 or 43-40, and the skirt may be formed using 4032-T651 aluminum. In such cases, the cylinders and crankcase preferably comprise a cast iron composition. The engine braking valve parts preferably comprise machined steel parts, with the exception of the valve guide 162 which is made of bronze. The double-direction hydraulic piston seals 177 and 178 are preferably made of Teflon® and energized by O-rings. The O-rings 274, 276, and 278 are preferably made of a synthetic plastic material.

Opposed-Piston Engine Braking Operations:

In FIG. 5, with an engine braking valve closed, an opposed-piston engine exhibits normal operation during which the pistons in a cylinder undergo a complete stroke-cycle with each complete crankshaft revolution. In this regard, with the exhaust port closed, charge air enters the cylinder through the intake port at some initial pressure during an intake/compression stroke. As the intake port closes, the charge air is compressed between the piston end surfaces and the pressure rises at an increasing rate as the pistons move toward TDC. Prior to TDC, fuel is injected into the cylinder. At a particular pressure the temperature of the compressed air initiates combustion. Combustion causes the pressure to rise rapidly and peak as the pistons move through TDC, following which the pressure declines at a decreasing rate during the power/exhaust stroke as the pistons approach BDC. The cycle repeats through another revolution of the crankshaft.

In FIG. 6, with fuel injection interrupted and an EGR valve (if any) kept closed, an engine braking valve is continuously opened to provide communication between the cylinder and the exhaust channel throughout successive stroke-cycles of engine operation. In this manner the pumping work done by the pistons is lost as heat as the charge air flows out through the engine braking valve. Preferably, once the charge air is expanded through the engine braking valve, it is discharged into the exhaust channel; in some aspects, the charge air can be discharged into the intake channel. Continuous engine braking is provided as the pistons reciprocate between TDC and BDC when an engine braking valve is opened because the engine will perform negative work during both the compression stroke and the exhaust stroke.

Control of the engine braking valve can be provided by a user-operated switch mounted on a vehicle dashboard or on a braking pedal.

Application of the engine braking valve is not limited to opposed-piston engines. In fact one or more engine braking valves can be mounted to a cylinder head for continuous engine braking in conventional two- and four-stroke engines.

The invention has been described with reference to a ported, opposed-engine construction, and it should be understood that various aspects of the invention can be applied to opposed-piston engines with one, two, and three or more crankshafts, without departing from the spirit of the invention. Furthermore, the opposed-piston engine can be one with any method of piston articulation, without departing from the spirit of the invention. Moreover, various aspects of the invention can be applied to opposed-piston engines with cylinders disposed in opposition, or on either side of one or more crankshafts, without departing from the spirit of the invention. Accordingly, the invention is limited only by the following claims.

We claim:

1. A method of operating a two-stroke, opposed-piston engine with at least one ported cylinder and pair of pistons disposed in opposition in the cylinder, in which injection of fuel into the cylinder is interrupted while charge air entering the cylinder between the opposed pistons is continuously released from the cylinder through an engine braking valve as the pistons move between BDC and TDC positions.

2. The method of operating a two-stroke, opposed-piston engine with at least one ported cylinder and pair of pistons disposed in opposition in the cylinder as recited in claim 1, in which the charge air is released into an exhaust channel of the engine.

3. The method of operating a two-stroke, opposed-piston engine with at least one ported cylinder and pair of pistons disposed in opposition in the cylinder as recited in claim 1, in which the charge air entering the cylinder is compressed by a supercharger.

4. The method of operating a two-stroke, opposed-piston engine with at least one ported cylinder and pair of pistons disposed in opposition in the cylinder as recited in claim 1, in which an EGR valve is closed while the charge air is continuously discharged from the cylinder.

* * * * *